(12) United States Patent
Matsuyama et al.

(10) Patent No.: US 10,331,489 B2
(45) Date of Patent: Jun. 25, 2019

(54) APPARATUS AND METHOD FOR EXECUTING MAINTENANCE PROCESSING ON COMPUTERS COUPLED VIA A MULTIDIMENSIONAL MESH OR TORUS CONNECTION IN A NETWORK

(71) Applicant: FUJITSU LIMITED, Kawasaki-shi, Kanagawa (JP)

(72) Inventors: Kazuhiro Matsuyama, Numazu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 215 days.

(21) Appl. No.: 15/161,407

(22) Filed: May 23, 2016

(65) Prior Publication Data

US 2016/0357603 A1 Dec. 8, 2016

(51) Int. Cl.
G06F 9/46 (2006.01)
G06F 9/50 (2006.01)
H04L 12/24 (2006.01)

(52) U.S. Cl.
CPC ............ *G06F 9/5061* (2013.01); *H04L 41/00* (2013.01)

(58) Field of Classification Search
None
See application file for complete search history.

(56) References Cited

U.S. PATENT DOCUMENTS

2002/0002578 A1    1/2002  Yamashita
2010/0293551 A1*  11/2010  Ajima ................... G06F 9/4881
                                            718/104

FOREIGN PATENT DOCUMENTS

JP          2002-7364        1/2002

* cited by examiner

*Primary Examiner* — Kenneth Tang
(74) *Attorney, Agent, or Firm* — Staas & Halsey LLP

(57) ABSTRACT

Computers are connected via multidimensional mesh or torus connection in a network. In response to a request for executing maintenance processing on computers in the network, an apparatus detects execution-scheduled jobs to be executed after an execution start time of the maintenance processing, based on execution-scheduled start times of jobs to be executed by the computers. The apparatus calculates, for each execution-scheduled job, a characteristic value of an axial length of an execution-scheduled job area in each axial direction of multidimensional axes in the network, where the execution-scheduled job area includes a group of computers to execute the each execution-scheduled job. The apparatus determines a maintenance area in the network on which the maintenance processing is to be executed, based on the characteristic values of the axial lengths of the execution-scheduled job areas, and executes the maintenance processing on computers in the maintenance area.

8 Claims, 20 Drawing Sheets

FIG. 6

| WHOLE MAINTENANCE START TIME [mm/dd/yyyy hh:mm] | MAINTENANCE PROGRAM | MAINTENANCE PROCESSING REQUIRED TIME [min] |
|---|---|---|
| 11/22/2014 00:00 | mente.sh | 180 |

121a

FIG. 12
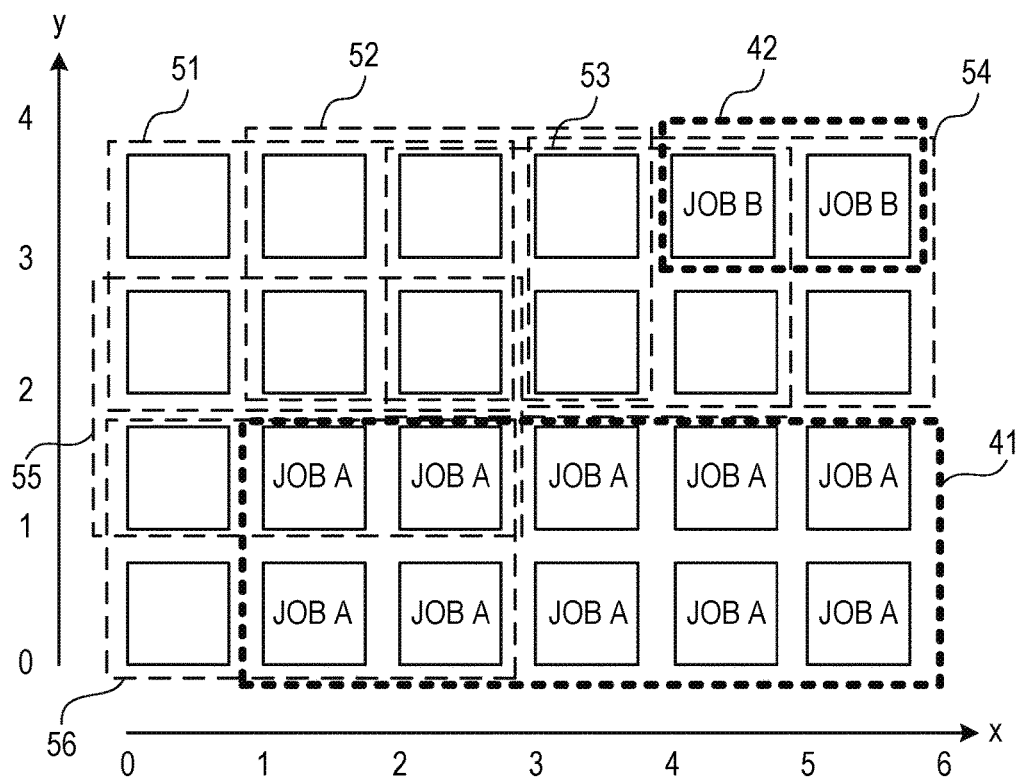
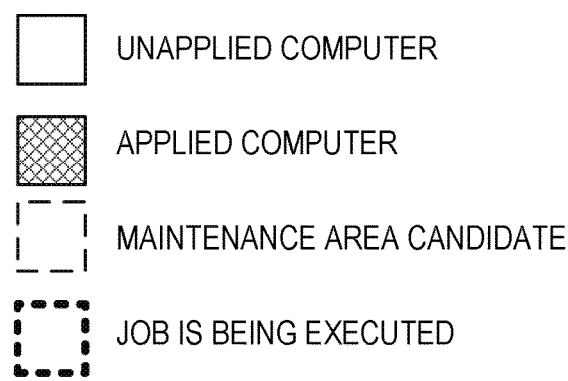

FIG. 13

| NUMBER | AREA | THE NUMBER OF COMPUTERS ADJACENT TO APPLIED COMPUTER | THE NUMBER OF COMPUTERS AT EDGE OF SYSTEM | THE NUMBER OF UNAPPLIED COMPUTERS |
|---|---|---|---|---|
| 1 | (0, 2) TO (3, 4) | 0 | 4 | 6 |
| 2 | (1, 2) TO (4, 4) | 0 | 3 | 6 |
| 3 | (2, 2) TO (5, 4) | 0 | 3 | 5 |
| 4 | (3, 2) TO (6, 4) | 0 | 4 | 4 |
| 5 | (0, 1) TO (3, 3) | 0 | 2 | 4 |
| 6 | (0, 0) TO (3, 2) | 0 | 4 | 2 |

| NUMBER | AREA | THE NUMBER OF COMPUTERS ADJACENT TO APPLIED COMPUTER | THE NUMBER OF COMPUTERS AT EDGE OF SYSTEM | THE NUMBER OF UNAPPLIED COMPUTERS |
|---|---|---|---|---|
| 1 | (3, 0) TO (6, 2) | 0 | 4 | 6 |
| 4 | (3, 1) TO (6, 3) | 1 | 2 | 6 |
| 5 | (3, 2) TO (6, 4) | 2 | 4 | 4 |

123a

FIG. 16
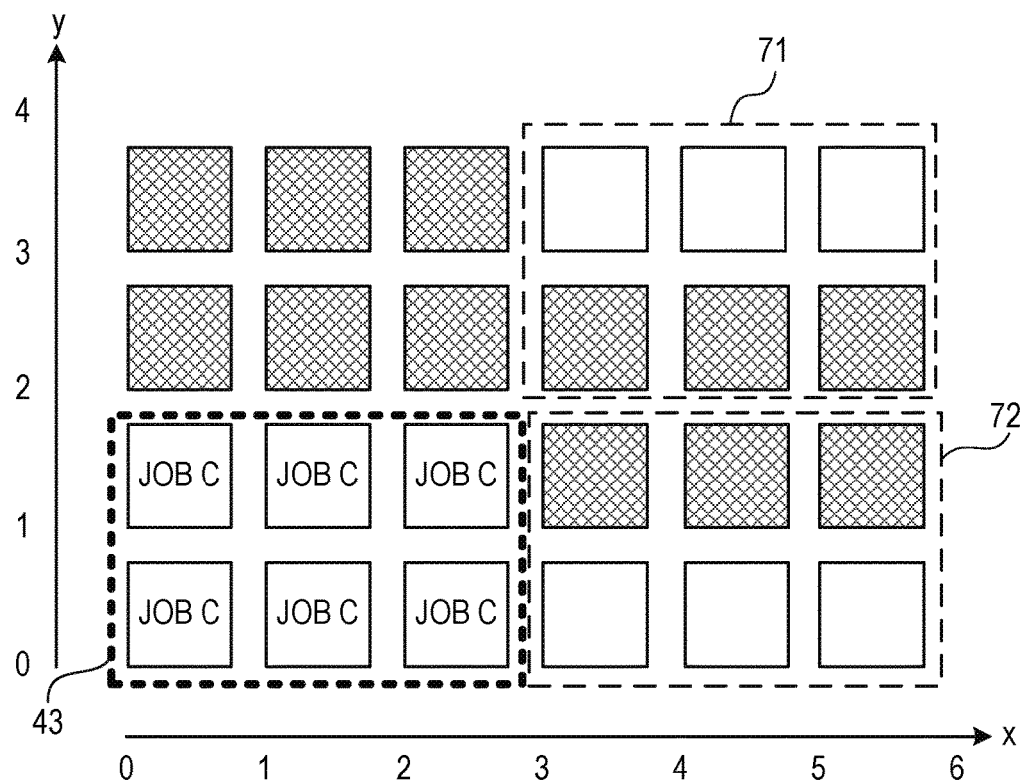
 UNAPPLIED COMPUTER
 APPLIED COMPUTER
 MAINTENANCE AREA CANDIDATE
 JOB IS BEING EXECUTED

FIG. 17

| NUMBER | AREA | THE NUMBER OF COMPUTERS ADJACENT TO APPLIED COMPUTER | THE NUMBER OF COMPUTERS AT EDGE OF SYSTEM | THE NUMBER OF UNAPPLIED COMPUTERS |
|---|---|---|---|---|
| 1 | (3, 0) TO (6, 2) | 3 | 4 | 3 |
| 2 | (3, 2) TO (6, 4) | 4 | 4 | 3 |

123a

FIG. 18
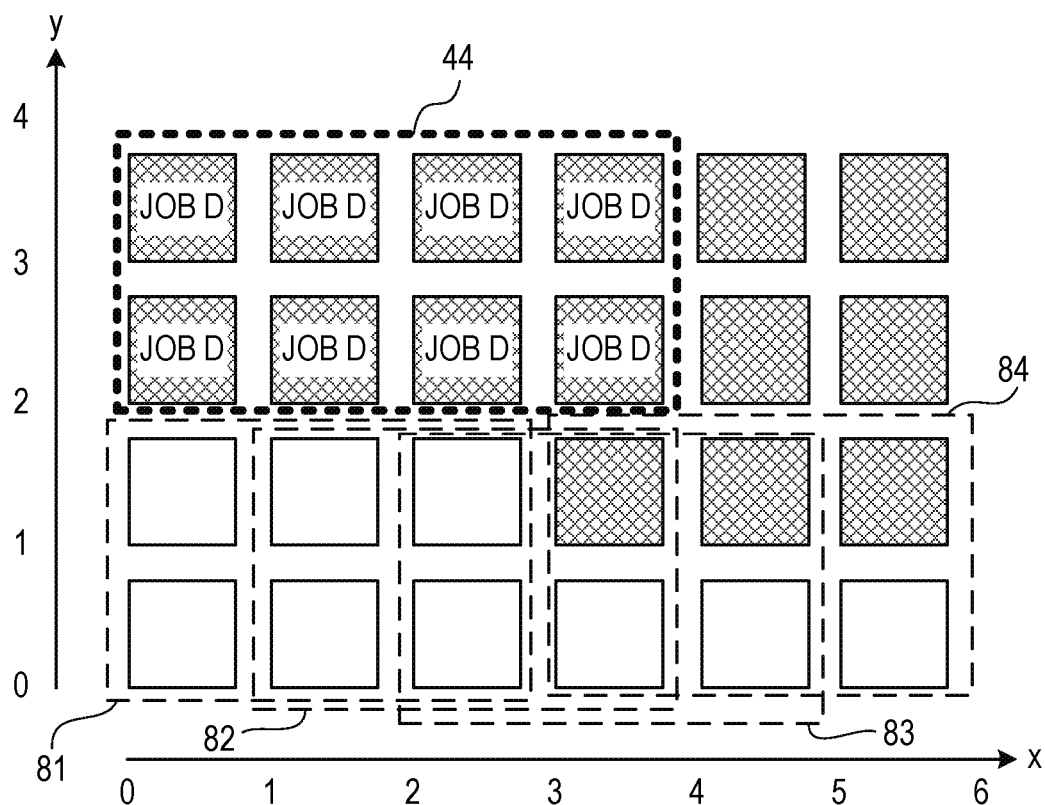
 UNAPPLIED COMPUTER
 APPLIED COMPUTER
 MAINTENANCE AREA CANDIDATE
 JOB IS BEING EXECUTED

FIG. 19

| NUMBER | AREA | THE NUMBER OF COMPUTERS ADJACENT TO APPLIED COMPUTER | THE NUMBER OF COMPUTERS AT EDGE OF SYSTEM | THE NUMBER OF UNAPPLIED COMPUTERS |
|---|---|---|---|---|
| 1 | (0, 0) TO (3, 2) | 4 | 4 | 6 |
| 2 | (1, 0) TO (4, 2) | 4 | 3 | 5 |
| 3 | (2, 0) TO (5, 2) | 4 | 3 | 4 |
| 4 | (3, 0) TO (6, 2) | 3 | 4 | 3 |

123a

- UNAPPLIED COMPUTER
- APPLIED COMPUTER
- MAINTENANCE AREA CANDIDATE
- JOB IS BEING EXECUTED

APPARATUS AND METHOD FOR EXECUTING MAINTENANCE PROCESSING ON COMPUTERS COUPLED VIA A MULTIDIMENSIONAL MESH OR TORUS CONNECTION IN A NETWORK

CROSS-REFERENCE TO RELATED APPLICATION

This application is based upon and claims the benefit of priority of the prior Japanese Patent Application No. 2015-113454, filed on Jun. 3, 2015, the entire contents of which are incorporated herein by reference.

FIELD

The embodiments discussed herein are related to apparatus and method for executing maintenance processing on computers coupled via a multidimensional mesh or torus connection in a network.

BACKGROUND

In large-scale computation such as scientific-technological computation using a computer system, parallel computation is performed using a plurality of computers. The computer system capable of performing parallel computation is referred to as a parallel computer system.

A large-scale parallel computer system includes many computers that perform parallel computation, and a management computer. The management computer manages jobs to be executed by the computers. For example, the management computer performs scheduling of the jobs inputted from a terminal device, and causes one or more computers to execute a job at an execution-scheduled start time.

The computers of the parallel computer system are interconnected, for example, via a mesh- or torus-type network topology. When the plurality of computers execute jobs in parallel in the mesh- or torus-connected network, a submesh including only free node is defined in the network. In a three-dimensional network, the submesh is a cubic area in the network. In a two-dimensional network, the submesh is a rectangular area in the network. Causing computers in the submesh to execute a job allows interference of communication between computers that process different jobs to be suppressed.

When a plurality of computers that execute parallel jobs are limited to computers in one submesh, interference of communication may be reliably suppressed. However, a group of free computers that are not allocated to any job are dispersed, thereby causing fragmentation of computer group. The fragmentation of computer group means that it is difficult to set a submesh including enough free computers allocated to a new job, and thus, the computer group is not allocated to the new job. The fragmentation of computer group contributes to lower the operating ratio of the entire parallel computer system.

One of techniques of the above job scheduling is job scheduling taking on migration into account.

A related technique is disclosed, for example, in Japanese Laid-open Patent Publication No. 2002-7364.

SUMMARY

According to an aspect of the invention, a plurality of computers are coupled via multidimensional mesh or torus connection in a network. In response to a request for executing maintenance processing on computers in the network, a maintenance device detects one or more execution-scheduled jobs to be executed after an execution start time of the maintenance processing, based on start time information indicating an execution-scheduled start time of a job to be executed by two or more computers, and calculates, for each of the one or more execution-scheduled jobs, a characteristic value of an axial length of an execution-scheduled job area in each axial direction of a plurality of multidimensional axes in the network, based on area information indicating a length of an execution-scheduled job area in each axial direction of the plurality of multidimensional axes, where the execution-scheduled job area includes a group of computers to execute the each execution-scheduled job. The maintenance device determines a maintenance area in the network on which the maintenance processing is to be executed, based on the characteristic values of the axial lengths of the execution-scheduled job areas for the one or more execution-scheduled jobs, and executes the maintenance processing on computers in the maintenance area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of maintenance setting information, according to an embodiment;

FIG. 12 is a diagram illustrating an example of a state of each computer before maintenance processing, according to an embodiment;

FIG. 13 is a diagram illustrating a first example of a maintenance area candidate list, according to an embodiment;

FIG. 15 is a diagram illustrating a second example of a maintenance area candidate list, according to an embodiment;

FIG. 16 is a diagram illustrating an example of a state of each computer after second maintenance processing, according to an embodiment;

FIG. 17 is a diagram illustrating a third example of a maintenance area candidate list, according to an embodiment;

FIG. 18 is a diagram illustrating an example of a state of each computer after third maintenance processing, according to an embodiment;

FIG. 19 is a diagram illustrating a fourth example of a maintenance area candidate list, according to an embodiment.

DESCRIPTION OF EMBODIMENTS

The parallel computer system may be subjected to maintenance processing such as software updating. In this case, all computers constituting the parallel computer system are generally suspended for a certain period to execute the system maintenance processing. However, when the all computers are suspended for the certain time, no job is executed during the period, thereby greatly lowering the operating ratio of the system.

Suspension of the whole system may be avoided by sequentially executing the maintenance processing from free computers for the certain period. This promotes fragmentation of a group of job-allocable computers, which is caused by mixture of maintained computers and unmaintained computers. That is, any job may not be allocated to the computers that are executing a job as well as the computers that are being maintained, to promote fragmentation of the job-allocable computers. Moreover, in the case where the maintenance processing is software updating, interchangeability between the maintained computers and the unmaintained computers may not be ensured. When interchangeability is not ensured, one of the following states is required: 1) all the computers included in a submesh allocated to one parallel job have been maintained, and 2) all the computers included in a submesh allocated to one parallel job have not been maintained yet. This is a rigid constraint on a group of computers for executing a job, increasing the possibility that the computers fails to execute the job. As a result, the operating ratio of the system further lowers.

It is desirable to suppress the lowering of an operating ratio of a parallel computer system due to maintenance processing.

Embodiments will be described below with reference to figures. A plurality of embodiments may be combined with each other so as not to cause contradiction.

First Embodiment

Figure 1:
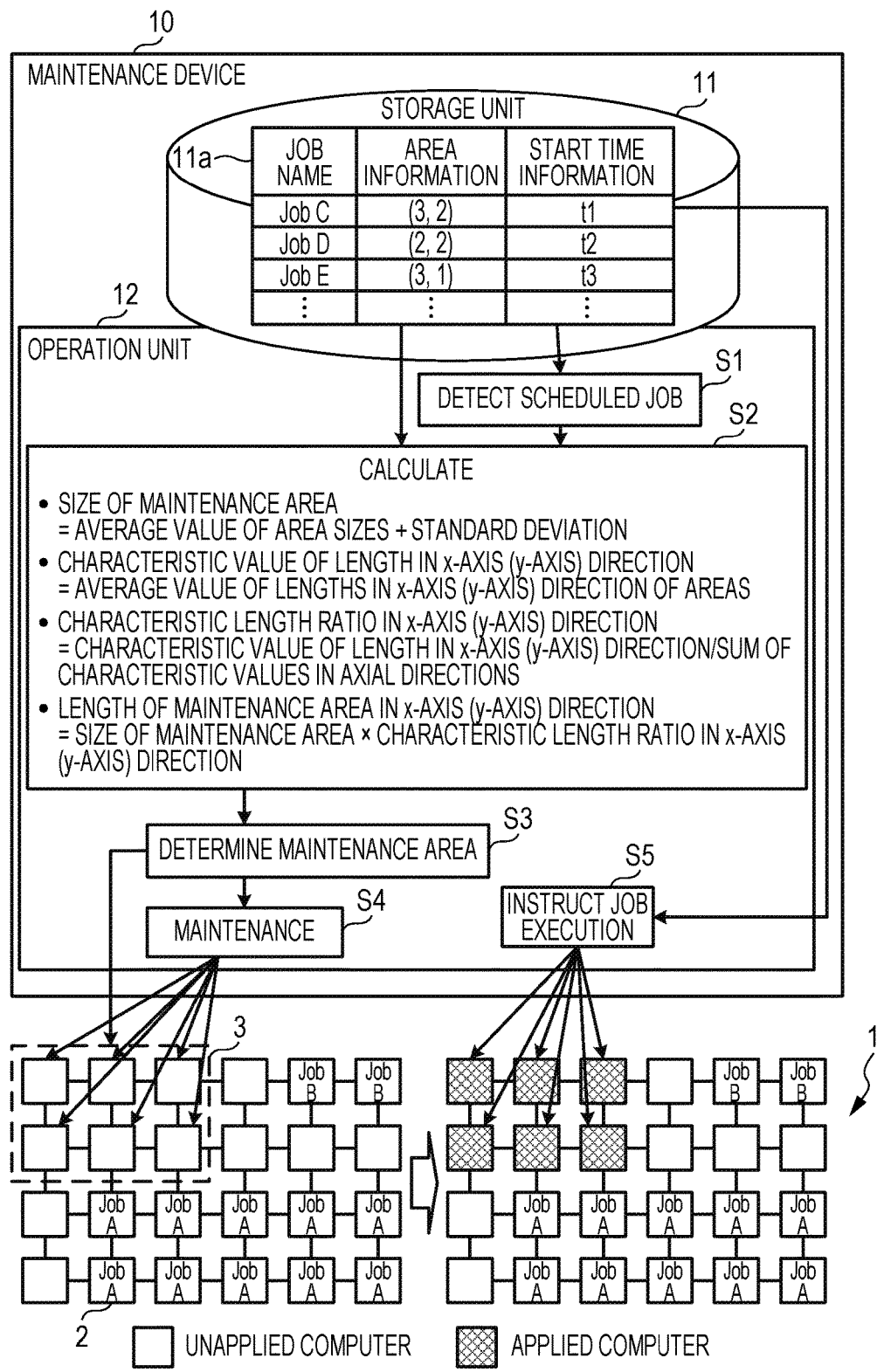
FIG. 1 is a diagram illustrating an example of a configuration of a parallel computer system, according to an embodiment.

FIG. 1 is a diagram illustrating exemplary configuration of a parallel computer system in accordance with First embodiment. In the parallel computer system, a plurality of mesh- or torus-connected computers 2 are provided in a multidimensional network 1 having a plurality of axes. Two or more computers among the plurality of computers 2 may execute the job by parallel processing.

The parallel computer system includes a maintenance device 10 that executes maintenance processing for each of the plurality of computers 2 in the network 1. For example, the maintenance device 10 executes maintenance processing such as program update for each of the computers 2 by remote control.

For example, the maintenance device 10 includes a storage unit 11 and an operation unit 12. The storage unit 11 stores schedule information 11a. For example, the schedule information 11a includes start time information indicating execution-scheduled start time of the job executed by two or more computers in parallel, and area information indicating axial lengths of an area including a computer group that executes the job. The area information defines, for example, desired size and shape of the area. The area size is expressed as the number of computers included in the area. A sum of lengths of the area in axial directions may be the area size. In the two-dimensional network, the length of the area in the x-axis direction and the length of the area in the y-axis direction are expressed as (x, y). The lengths (3, 2) of the area in the axial directions indicate a shape that has a length corresponding to three computers in the x-axis direction, and a length corresponding to two computers in the y-axis direction. The area size is "length in the x-axis direction× length in the y-axis length". In the case of the lengths (3, 2) of the area in the axial directions, the area size is "6" (six computers).

In response to an execution request for the maintenance processing, the operation unit 12 detects one or more execution-scheduled jobs to be executed after execution start time of the maintenance processing, based on the schedule information 11a (Step S1). Then, the operation unit 12 calculates statistical information such as characteristic values of the lengths of the area in the axial directions, based on the area information indicating the lengths of the area including the computer group allocated to the execution-scheduled jobs (Step S2). For example, the operation unit 12 calculates a size of a maintenance area 3, a characteristic value of the length in each axial direction, a characteristic length ratio in each axial direction, and a length of the maintenance area 3 in each axial direction. The size of the maintenance area 3 is the number of computers included in the maintenance area 3. In the two-dimensional network, for example, the values are calculated by following expressions.

size of maintenance area=average value of area sizes of respective jobs+standard deviation characteristic value of length in x-axis (y-axis) direction=average value of lengths in x-axis (y-axis) direction of areas of respective jobs characteristic length ratio in x-axis (y-axis) direction=characteristic value of lengths in x-axis (y-axis) direction/sum of characteristic values in axial directions length of maintenance area in x-axis (y-axis) direction=size of maintenance area×characteristic length ratio in x-axis (y-axis) direction The characteristic value of length in each axial direction may be a statistical value other than the average value (for example, a value found by multiplying a median value or an average value by an invariable (for example, 1.5)). To find size of the maintenance area, in place of the standard deviation, a value obtained by multiplying the standard deviation by an invariable (for example, 2) may be added.

The operation unit 12 determines the maintenance area 3 in the network 1, based on the characteristic value (Step S3). For example, the operation unit 12 sets an area in the network 1, which includes an unapplied computer subjected to no maintenance processing, and whose length in each axial direction is equal to that of the maintenance area 3 calculated using the characteristic value. Then, the operation unit 12 executes the maintenance processing on the computers in the maintenance area 3 (Step S4). The operation unit 12 repeats determination of the maintenance area 3 (Step S3) and the maintenance processing on the computers in the maintenance area 3 (Step S4) until the unapplied computer does not exist.

When there are a plurality of areas in the network 1, which include the unapplied computer and whose length in each axial direction is equal to that of the maintenance area 3 calculated using the characteristic value, one of the plurality of areas is set as the maintenance area 3. For example, the operation unit 12 determines an area that includes the largest number of computers adjacent to an applied computer subjected to the maintenance processing, as the maintenance area 3. The operation unit 12 may also determine an area including neither a computer that is currently executing a job nor a computer that is scheduled to start execution of a job during a time period from the present time until an elapse of time required for the maintenance processing, as the maintenance area 3.

At the execution-scheduled start time of a job represented in the schedule information 11a, the operation unit 12 allocates a computer to the job and instructs the allocated computer to execute the job (Step S5). For example, the operation unit 12 searches the network 1 for an area which has the size and shape indicated by the area information of the job to be executed, and in which any one of the computers is not executing another job and has not been subjected to the maintenance processing, and all the computers are in the same maintenance state. All the computers being in the same maintenance state means that any one of the computers has not been subjected to the maintenance processing (unapplied computers) or all the computers have been subjected to the maintenance processing (applied computers). According to the instruction from the operation unit 12, the job is executed by the computers in parallel.

Such parallel computer system calculates the characteristic value in each axial direction, based on the area information on the execution-scheduled job. For example, size and shape of the maintenance area 3 are defined using the characteristic value. Size and shape of the maintenance area 3 are defined to include a computer group that may execute most of the execution-scheduled job. For example, size and shape of the maintenance area 3 are defined to include a computer group that may execute a predetermined ratio of the execution-scheduled job or more.

The maintenance area 3 having the defined size and shape is determined in the network 1, and the maintenance processing on the computers included in the maintenance area 3 is executed. The maintenance area 3 is larger than average value of areas each including the computer group allocated to the execution-scheduled job. For this reason, a job of certain size or smaller may be executed using the computers in the maintenance area 3 after the maintenance processing. That is, in the First embodiment, even when computers subjected to the maintenance processing and computers subjected to no maintenance processing coexist in the network 1, fragmentation of the computers in the same maintenance state is suppressed. Therefore, maintenance of the entire system may be performed in stages while suppressing the effect of fragmentation caused by mixture of the maintained computer group and the unmaintained computer group.

When there are a plurality of areas as candidates for the maintenance area 3 in the network 1, an area including the greater number of computers adjacent to the applied computer subjected to the maintenance processing is determined as the maintenance area 3. This suppresses dispersion of the applied computers, thereby facilitating allocation of a group of applied computers when allocating a computer group to the job.

Further, an area not including a computer that is scheduled to start execution of a job during a time period from the present time until an elapse of the required maintenance time is determined as the maintenance area 3. This suppresses change in the job schedule due to execution of the maintenance processing.

For example, the operation unit 12 may be implemented by a processor of the maintenance device 10. For example, the storage unit 11 may be implemented by a memory of the maintenance device 10.

Second Embodiment

Next, Second embodiment will be described.

Figure 2:
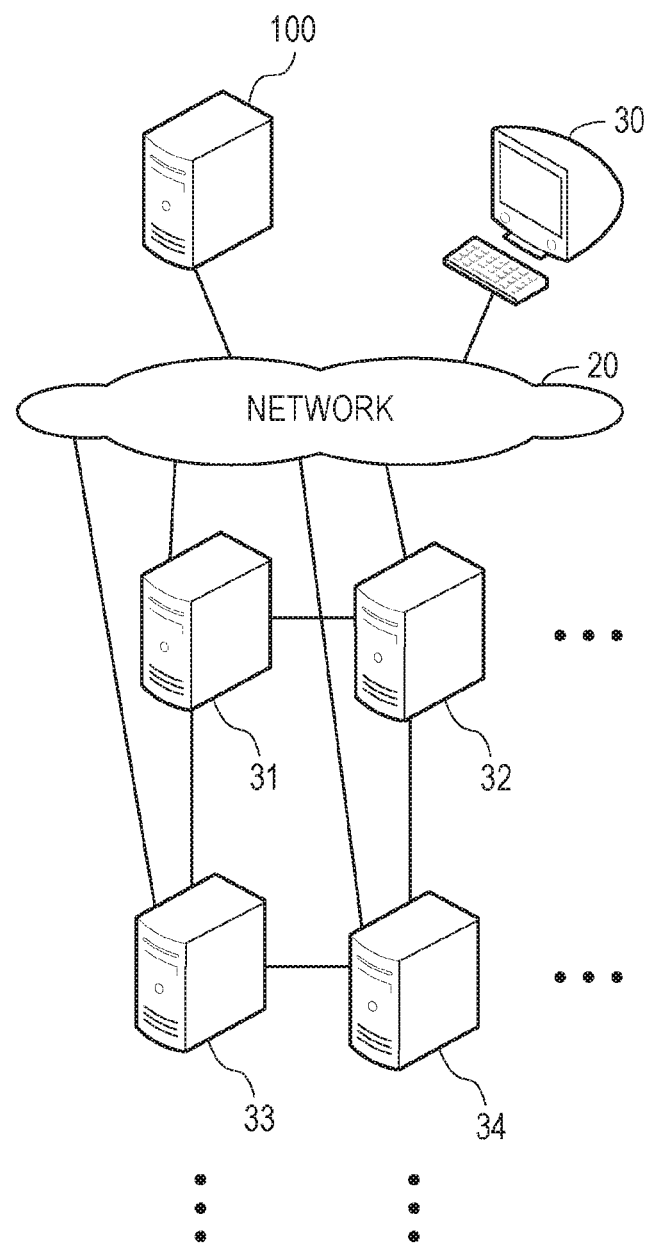
FIG. 2 is a diagram illustrating an example of a configuration of a parallel computer system, according to an embodiment.

FIG. 2 is a diagram illustrating exemplary configuration of a parallel computer system in Second embodiment. In the parallel computer system, a plurality of computers 31, 32, 33, 34 . . . for executing a job are interconnected via a network 20. A management computer 100 and a terminal device 30 are connected to the network 20. The management computer 100 is a computer that manages the job executed by the plurality of computers 31, 32, 33, 34 . . . . The terminal device 30 is a computer used by a system administrator. The computers 31, 32, 33, 34 . . . are interconnected via a wide-band transmission path such as a fiber channel, in a mesh- or torus-connected network topology.

Figure 3:
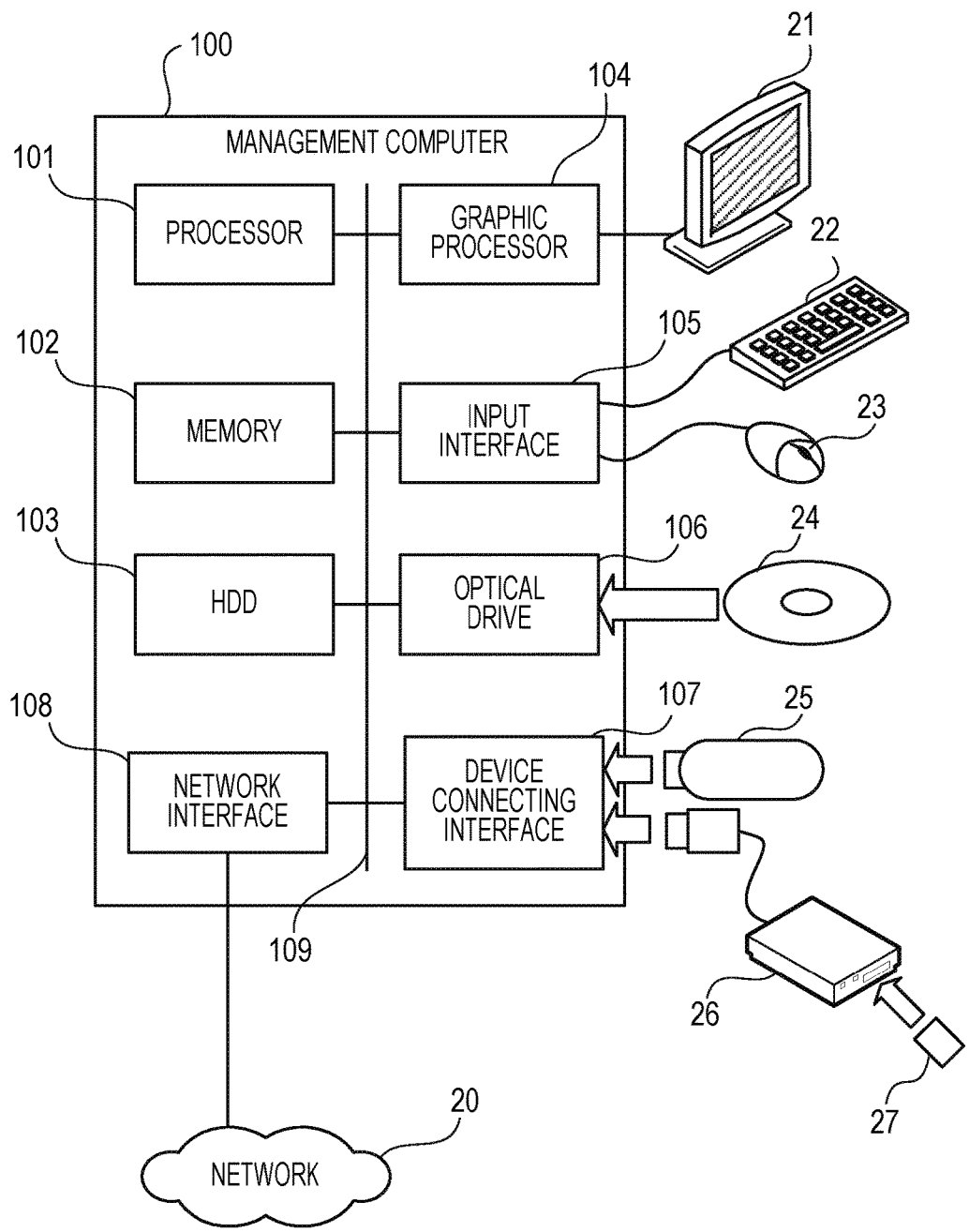
FIG. 3 is a diagram illustrating an example of a configuration of hardware of a management device, according to an embodiment.

FIG. 3 is a diagram illustrating exemplary configuration of hardware of the management computer. The management computer 100 is controlled by a processor 101 as a whole. A memory 102 and a plurality of peripheral devices are connected to the processor 101 via a bus 109. The processor 101 may be a multiprocessor. The processor 101 may be a CPU (Central Processing Unit), an MPU (Micro Processing Unit), or a DSP (Digital Signal Processor). An electronic circuit such as an ASIC (Application Specific Integrated Circuit) and a PLD (Programmable Logic Device) may perform at least a part of the functions that are achieved by causing the processor 101 to run a program.

The memory 102 is used as a main memory of the management computer 100. The memory 102 temporarily stores at least a part of an OS (Operating System) program and an application program that are run by the processor 101. The memory 102 stores various data used in processing of the processor 101. Examples of the memory 102 include a volatile semiconductor memory such as a RAM (Random Access Memory).

The peripheral devices connected to the bus 109 include an HDD (Hard Disk Drive) 103, a graphic processor 104, an input interface 105, an optical drive 106, a device connecting interface 107, and a network interface 108.

The HDD 103 magnetically writes and reads data to or from an internal disc. The HDD 103 is used as an auxiliary memory of the management computer 100. The HDD 103 stores an OS program, an application program, and various data. A nonvolatile semiconductor memory (SSD: Solid State Drive) such as a flash memory may be used as the auxiliary memory.

A monitor 21 is connected to the graphic processor 104. The graphic processor 104 displays an image on a screen of the monitor 21, according to an instruction of the processor 101. Examples of the monitor 21 include a display using a CRT (Cathode Ray Tube) and a liquid crystal display.

A keyboard 22 and a mouse 23 are connected to the input interface 105. The input interface 105 transmits a signal from the keyboard 22 or the mouse 23 to the processor 101. The mouse 23 is an example of a pointing device, and may be another pointing device. Other pointing devices include a touch panel, a tablet, a touch pad, and a track ball.

The optical drive 106 reads data recorded on the optical disc 24 by using laser light or the like. The optical disc 24 is a portable recording medium from which data may be read by light reflection. Examples of the optical disc 24 include a DVD (Digital Versatile Disc), a DVD-RAM, a CD-ROM (Compact Disc Read Only Memory), and a CD-R (Recordable)/RW (ReWritable).

The device connecting interface 107 is a communication interface for connecting the peripheral devices to the management computer 100. For example, a memory 25 and a memory reader/writer 26 may be connected to the device connecting interface 107. The memory 25 is a recording medium having a function of communicating with the device connecting interface 107. The memory reader/writer 26 serves to write data to a memory card 27, and to read data from the memory card 27. The memory card 27 is a card-type recording medium.

The network interface 108 is connected to the network 20. The network interface 108 transmits and receives data to and from other computers or communication device via the network 20.

Such hardware configuration may perform the processing in Second embodiment. The device in First embodiment may be also embodied by the same hardware as the management computer 100 illustrated in FIG. 3.

For example, the management computer 100 runs a program recorded in a computer-readable recording medium to perform the processing in Second embodiment. The program describing contents of the processing executed by the management computer 100 may be recorded in various recording media. For example, the program run by the management computer 100 may be stored in the HDD 103. The processor 101 loads at least a part of the program in the HDD 103 into the memory 102, and runs the program. The program to be run by the management computer 100 may be stored in portable recording media such as an optical disc 24, the memory 25, and a memory card 27. The program stored in the portable recording media is installed into the HDD 103, according to control of the processor 101, to become available. The processor 101 may directly read a program from a portable recording medium.

Figure 4:
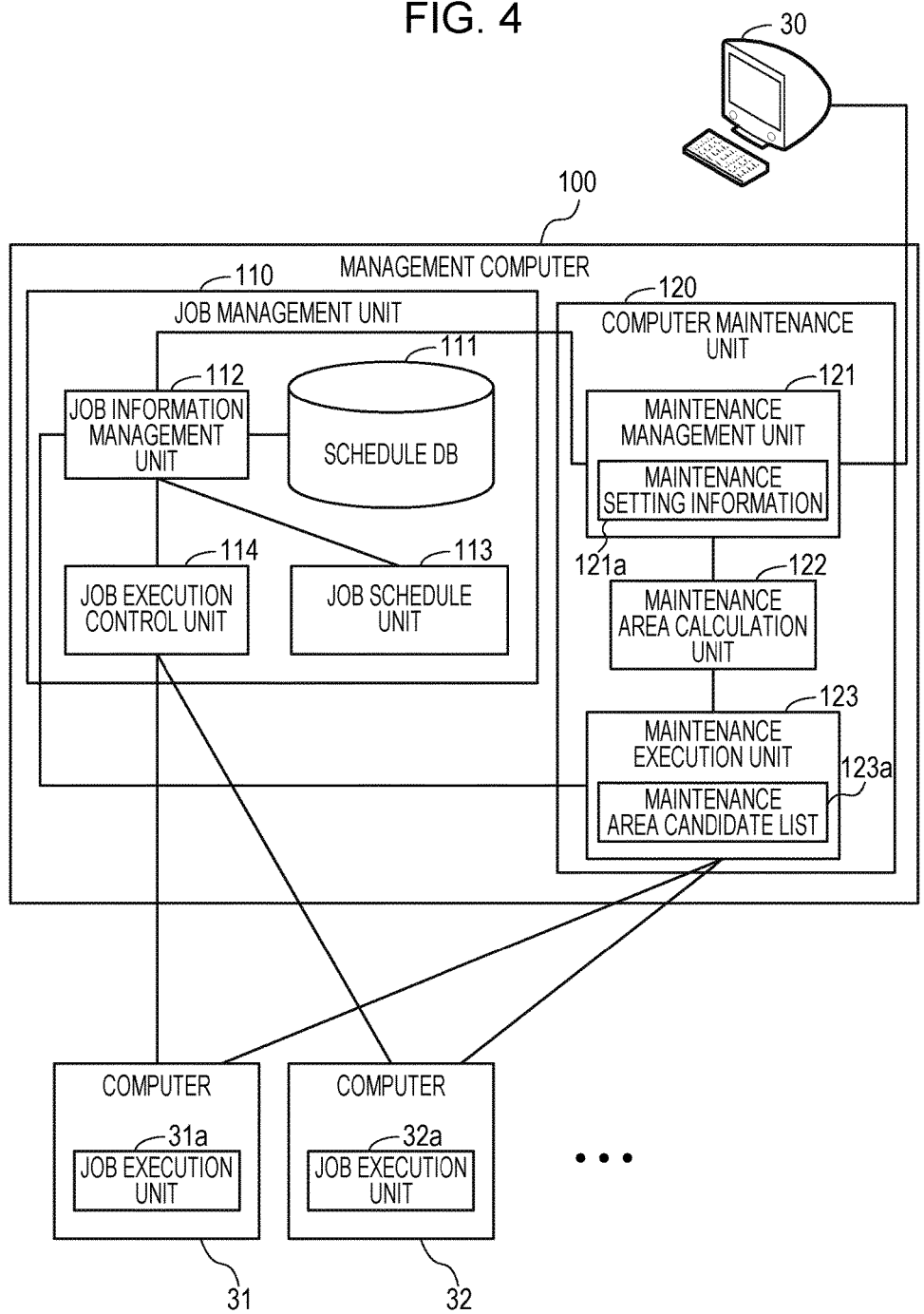
FIG. 4 is a diagram illustrating an example of functions of a management device, according to an embodiment.

FIG. 4 is a block diagram illustrating functions of the management computer. The management computer 100 includes a job management unit 110 and a computer maintenance unit 120.

The job management unit 110 manages a job executed by the computers 31, 32, . . . . The job management unit 110 includes a schedule DB 111, a job information management unit 112, a job schedule unit 113, and a job execution control unit 114.

The schedule DB 111 is a database for storing a job execution schedule. For example, a part of a storage area of the memory 102 or the HDD 103 is used as the schedule DB 111.

When a job to be executed is entered, the job information management unit 112 manages information on the entered job. For example, when receiving the information on a job to be executed, from the terminal device 30, the job information management unit 112 requests the job schedule unit 113 to schedule execution of the job. When receiving a scheduling result from the job schedule unit 113, the job information management unit 112 stores the scheduling result in the schedule DB 111. When the execution-scheduled start time of the job is reached, the job information management unit 112 allocates computers to the job, and notifies the job execution control unit 114 that the execution-scheduled start time of the job is reached. The job information management unit 112 also manages the job execution state, and notifies the computer maintenance unit 120 of the execution state of each job.

When the computers are allocated to a job, the job execution control unit 114 instructs the allocated computers to execute the job. For example, when a plurality of computers are allocated to the job, the job execution control unit 114 instructs the plurality of computers to execute the job in parallel.

The computer maintenance unit 120 operates in cooperation with the job management unit 110, and executes the maintenance processing for the computer. For example, the computer maintenance unit 120 determines a maintenance area of the computer group reserved for maintenance, which has a predetermined size of submesh or subtorus shape. Based on the maintenance area, the computer maintenance unit 120 executes the maintenance processing for the computers. For example, the computer maintenance unit 120 upgrades application software installed in the computers by remote control. To execute computer maintenance processing, the computer maintenance unit 120 includes a maintenance management unit 121, a maintenance area calculation unit 122, and a maintenance execution unit 123.

The maintenance management unit 121 manages contents of the maintenance processing. For example, the maintenance management unit 121 acquires maintenance setting information 121a indicating maintenance contents from the terminal device 30, and stores the maintenance setting information 121a in the memory 102. The maintenance management unit 121 communicates with the job management unit 110 to acquire information on the job being executed and the computers allocated to the job. When the execution start time of the maintenance processing is reached, the maintenance management unit 121 transmits the information acquired from the job management unit 110 and the maintenance setting information 121a to the maintenance area calculation unit 122, and request calculation of the maintenance area.

The maintenance area calculation unit 122 calculates shape of the maintenance area, according to shape of unprocessed job. A shape of a job means a shape of a submesh including the computer group allocated to the job. The shape of a job is previously designated by the user who request execution of the job. For example, the maintenance area calculation unit 122 calculates a size and a shape of the maintenance area so that computers allocated to jobs whose ratio to the pending jobs is equal to or greater than a predetermined ratio are included in the maintenance area.

Based on size and shape of the calculated maintenance area, the maintenance execution unit 123 ensures the maintenance area in the network, and executes the maintenance processing on computers included in the ensured maintenance area. For example, the maintenance execution unit 123 searches the network for an area as a maintenance area candidate. The maintenance area candidate has size and shape corresponding to size and shape of job to be executed. The found maintenance area candidate is registered in a maintenance area candidate list 123a. The maintenance area candidate list 123a is stored in the memory 102, for example. The maintenance execution unit 123 selects a suitable maintenance area candidate from among the maintenance area candidates registered in the maintenance area candidate list 123a, and determines the selected maintenance area candidate to be the maintenance area. Then, the maintenance execution unit 123 executes the maintenance processing on computers, in the maintenance area, that have not been subjected to maintenance processing.

The computers 31, 32, . . . include job execution units 31a, 32a, . . . , respectively. The job execution units 31a, 32a, . . . execute the jobs according to an instruction from the management computer 100.

A line connecting the elements to each other in FIG. 4 denotes a part of a communication path, and a communication path other than the illustrated communication paths may be set. For example, a function of each element in FIG. 4 may be performed by causing a computer to execute a program module corresponding to the element.

Next, data stored in the schedule DB 111 will be specifically described.

Figure 5:
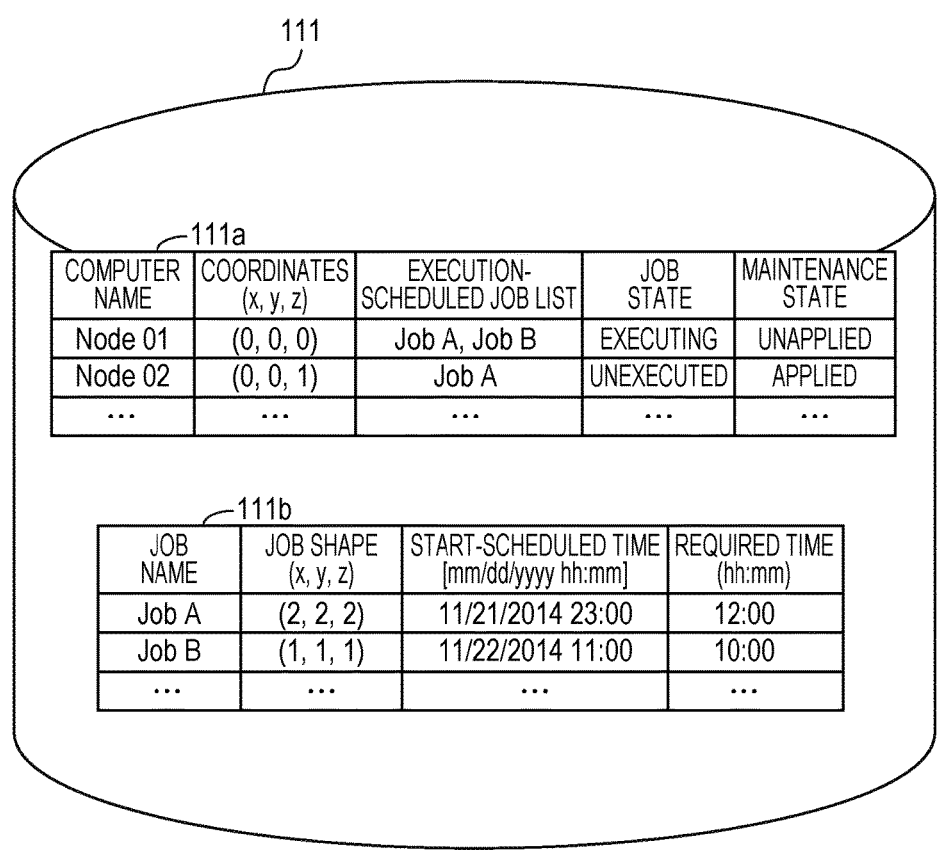
FIG. 5 is a diagram illustrating an example of a schedule data base, according to an embodiment.

FIG. 5 is a diagram illustrating an example of data of a schedule DB. The schedule DB 111 stores a computer management table 111a and a job execution schedule table 111b.

The computer management table 111a has columns of a computer name, coordinates, an execution-scheduled job list, a job state, and a maintenance state. The computer name is set in the computer name column. Coordinates indicating the position of the computer in the mesh or torus network are set in the coordinate column. The list of job to be executed by the computers is set in the execution-scheduled job list column. Whether the computer is executing the job or not (unexecuted) is set in the job state column. Whether the maintenance processing is applied to the computer or not is set in the maintenance state column.

The job execution schedule table 111b has columns for a job name, a job shape, a start-scheduled time, and a required time. The job name of the execution-scheduled job is set in the job name column. The shape of an area (submesh) occupied by the computer group allocated to the job is set in the job shape column. For example, the job shape is designated by lengths in the x-axis, y-axis, and z-axis directions. The job start-scheduled time is set in the start-scheduled time column. The time required for the job is set in the required time column.

Next, the maintenance setting information 121a will be specifically described.

FIG. 6 is a diagram illustrating an example of maintenance setting information. The maintenance setting information 121a includes a whole maintenance start time, a maintenance program, and a maintenance processing required time. The whole maintenance start time is time when the maintenance processing for the whole system starts. The maintenance program describes a procedure of automatic maintenance processing for each computer. The maintenance processing required time is a time required for the maintenance processing per computer.

Predetermined maintenance processing for each of the computers 31, 32, . . . in the network 20 is executed using the management computer 100 thus configured. The maintenance processing will be described below in detail.

Figure 7:
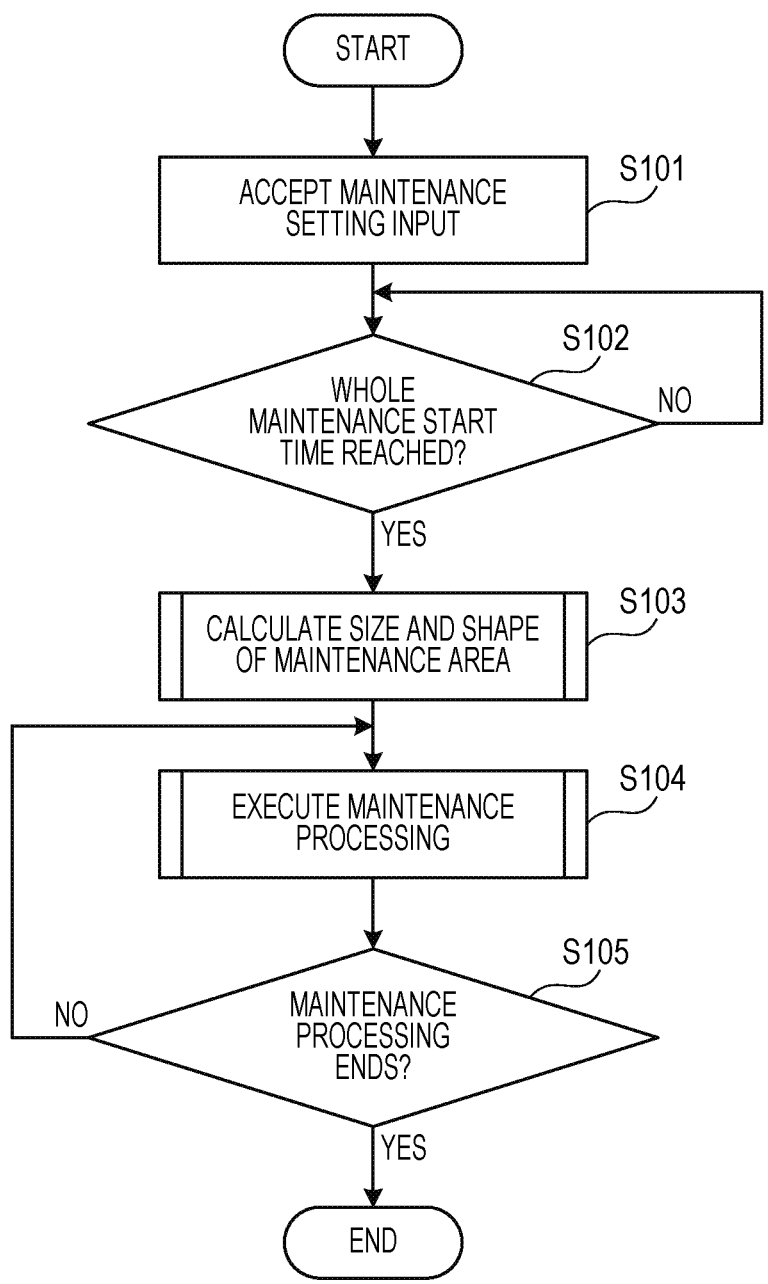
FIG. 7 is a diagram illustrating an example of an operational flowchart for maintenance processing, according to an embodiment.

FIG. 7 is an operational flowchart illustrating an example of the procedure of the maintenance processing.

[Step S101] The maintenance management unit 121 of the computer maintenance unit 120 accepts an input of maintenance setting from the terminal device 30. The maintenance management unit 121 stores the inputted contents as the maintenance setting information 121a in the memory 102.

[Step S102] The maintenance management unit 121 determines whether or not the whole maintenance start time indicated by the maintenance setting information 121a is reached. When the whole maintenance start time is reached, the maintenance management unit 121 instructs the maintenance area calculation unit 122 to calculate the maintenance area by transmitting the maintenance setting information 121a thereto, and proceeds processing to Step S103. When the whole maintenance start time is note reached, the processing in Step S102 is repeated.

[Step S103] The maintenance area calculation unit 122 calculates a size and a shape of the maintenance area. Details of the processing will be described later (See FIG. 8).

[Step S104] The maintenance execution unit 123 acquires a calculation result of the size and shape of the maintenance area from the maintenance area calculation unit 122, and executes the maintenance processing on each of the computers in one maintenance area. Details of a procedure of executing the maintenance will be described later.

[Step S105] The maintenance execution unit 123 determines whether or not the maintenance processing on all the computers is completed. When the maintenance processing is completed, processing ends. When the maintenance processing is not completed, processing proceeds to Step S104, and the maintenance processing on computers in another maintenance area is executed.

Next, a procedure of calculating a size and a shape of the maintenance area will be described.

Figure 8:
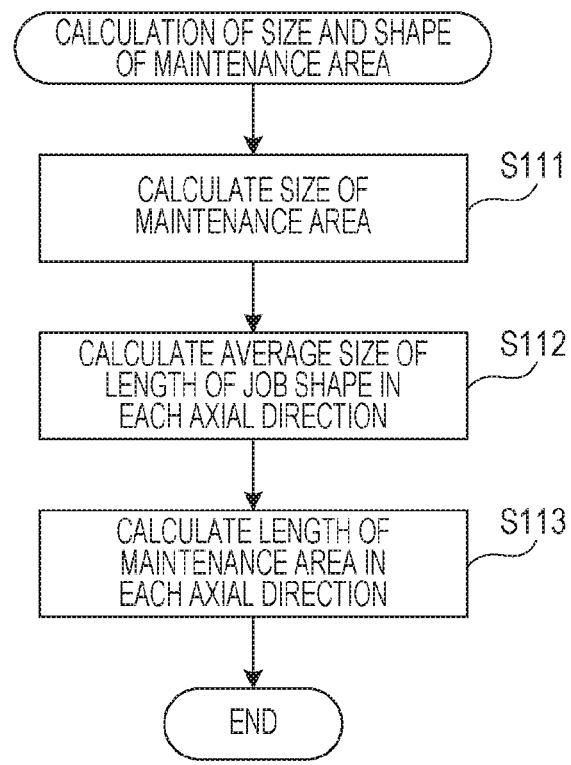
FIG. 8 is a diagram illustrating an example of an operational flowchart for calculating size and shape of a maintenance area, according to an embodiment.

FIG. 8 is an operational flowchart illustrating an example of the procedure of calculating a size and a shape of the maintenance area.

[Step S111] The maintenance area calculation unit 122 calculates a size of the maintenance area. For example, the maintenance area calculation unit 122 make following calculation by using information on jobs to be executed after the whole maintenance start time (execution-scheduled job) among the execution-scheduled jobs in the job execution schedule table 111b.

<size of maintenance area>=<average value of job size>+<standard deviation of job size>

Here, the job size refers to the number of computers allocated to a job, and may be calculated by multiplying lengths of the job shape in the axial directions. For example, size of a "job A" in the job execution schedule table 111b in FIG. 5 is "2×2×2=8". The "average value of job size" is obtained by calculating an arithmetic mean of size of execution-scheduled jobs. Further, the standard deviation of job sizes may be calculated based on size of each execution-scheduled job. The standard deviation of job sizes is a positive square root of dispersion of job sizes, and represents the degree of variation in job size. By setting a sum of the average value of job sizes and the standard deviation of job sizes as size of the maintenance area, an area having a size that enables execution of the large majority of execution-scheduled jobs may be designated as the maintenance area.

[Step S112] The maintenance area calculation unit 122 calculates an average value of job shapes in each axial direction. For example, the maintenance area calculation unit 122 extracts the length in the x-axis direction from the shape of each execution-scheduled job, and set an arithmetic average of the extracted lengths as the average value in the x-axis direction. Similarly, the average values of the lengths in each of the y-axis direction and the z-axis direction are obtained.

[Step S113] The maintenance area calculation unit 122 calculates a length of the maintenance area in each axial direction. To calculate the length of the maintenance area in each axial direction, the maintenance area calculation unit 122 first calculates the characteristic length ratio of the jobs in each axial direction.

<characteristic length ratio of jobs in x-axis direction>=<average value of length of jobs in x-axis direction>/<sum of average values of jobs in axial directions>

<characteristic length ratio of jobs in y-axis direction>=<average value of length of jobs in y-axis direction>/<sum of average values of jobs in axial directions <characteristic length ratio of jobs in z-axis direction>=<average value of length of jobs in z-axis direction>/<sum of average values of jobs in axial directions>

In this manner, the characteristic length ratio in each axial direction is obtained. Using the characteristic length ratio in each axial direction, the lengths of the maintenance area in the axial directions are obtained according to following expressions.

<length of maintenance area in x-axis direction>=<size of maintenance area>×<characteristic length ratio of jobs in x-axis direction>

<length of maintenance area in y-axis direction>=<size of maintenance area>×<characteristic length ratio of jobs in y-axis direction>

<length of maintenance area in z-axis direction>=<size of maintenance area>×<characteristic length ratio of jobs in z-axis direction>

A digit to the right of the decimal point in the calculation result of the length in each axial direction is round up. The maintenance area calculation unit 122 inputs the calculated "size and shape of maintenance area", and outputs a maintenance processing execution command to the maintenance execution unit 123.

Next, a procedure of executing the maintenance processing will be described in detail.

Figure 9:
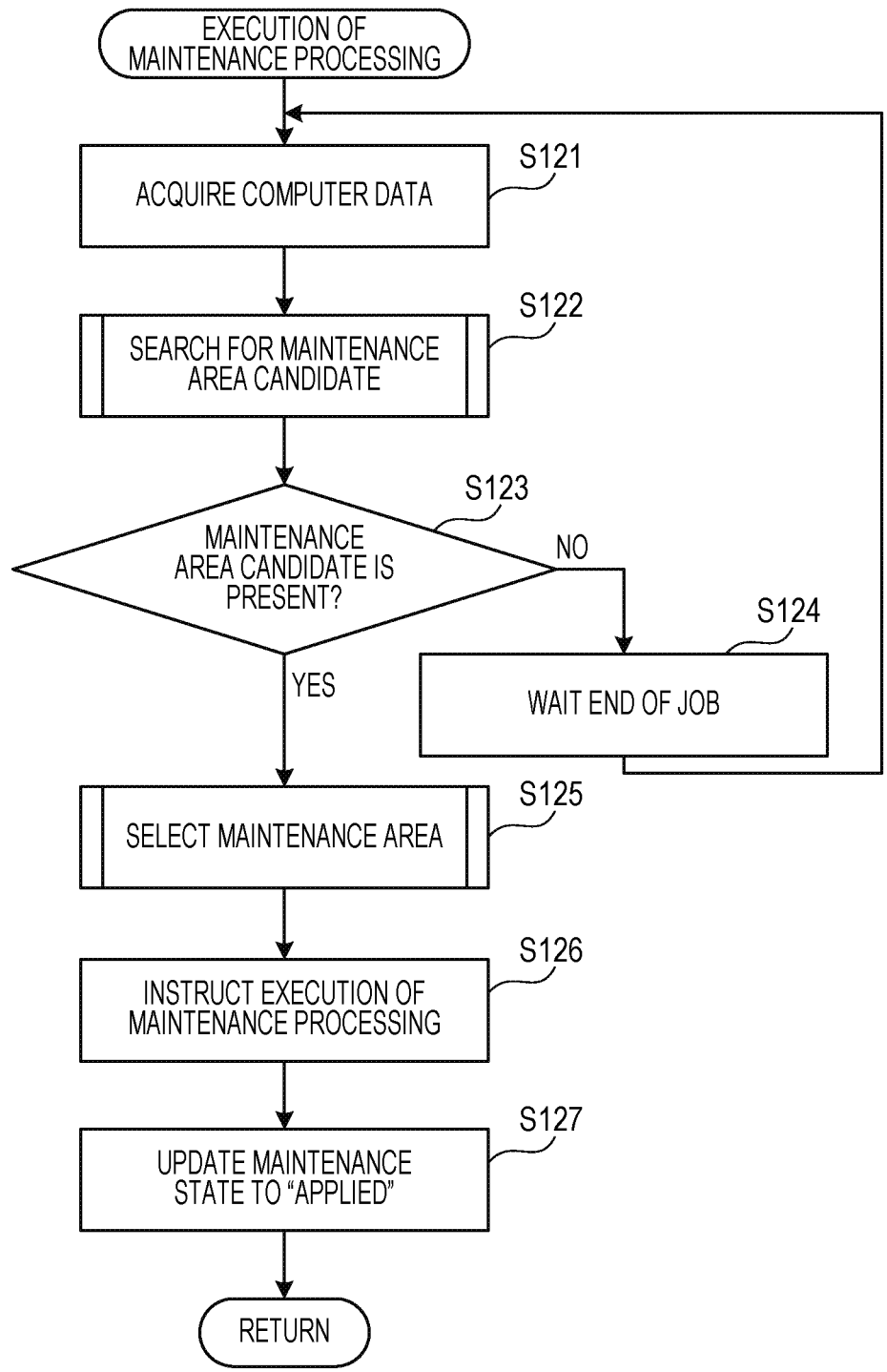
FIG. 9 is a diagram illustrating an example of an operational flowchart for executing maintenance processing, according to an embodiment.

FIG. 9 is an operational flowchart illustrating an example of the procedure of executing the maintenance processing.

[Step S121] The maintenance execution unit 123 inquires the job information management unit 112 about data on computer, and acquires the data. For example, in response to the inquiry from the maintenance execution unit 123, the job information management unit 112 transmits information stored in the computer management table 111a to the maintenance execution unit 123.

[Step S122] The maintenance execution unit 123 searches for a maintenance area candidate. Details of the processing will be described later (See FIG. 10).

[Step S123] The maintenance execution unit 123 determines whether or not at least one maintenance area candidate is found. When the maintenance area candidate is found, processing proceeds to Step S125. When the maintenance area candidate is not found, processing proceeds to Step S124.

[Step S124] The maintenance execution unit 123 waits end of at least one job being executed. For example, when at least one job ends, the job information management unit 112 notifies the maintenance execution unit 123 of the end of execution of the job. In response to the notification from the job information management unit 112, the maintenance execution unit 123 recognizes the end of execution of the job. When the job ends, processing proceeds to Step S121.

[Step S125] When there is at least one maintenance area candidate, the maintenance execution unit 123 selects the maintenance area from the at least one maintenance area candidate. Details of maintenance area selection processing will be described later (See FIG. 11).

[Step S126] The maintenance execution unit 123 instructs a computer that has not been subjected to the maintenance processing among the computers in the selected maintenance area, to execute the maintenance processing. At this time, for example, the maintenance execution unit 123 may change the maintenance state of the computer to be subjected to the maintenance processing, to "Applying", and then start the maintenance processing. To change the maintenance state, for example, the computer name of the computer subjected to the maintenance processing is notified from the maintenance execution unit 123 to the job information management unit 112. Then, the job information management unit 112 updates the maintenance state of the corresponding computer in the computer management table 111a, to "Applying".

The maintenance processing is executed using a maintenance program. For example, the maintenance execution unit 123 transmits the maintenance program to a computer to be maintained, and instructs the computer to execute the maintenance program. Upon receiving an execution instruction, each computer runs the maintenance program. Thereby, the maintenance processing on the computer is automatically performed. The computer that completes the maintenance processing transmits a response of operation end to the maintenance execution unit 123. When the maintenance execution unit 123 receives the responses of the operation end from all the computers to be maintained, processing proceeds to Step S127.

[Step S127] The maintenance execution unit 123 updates the maintenance state of the computers that have been subjected to the maintenance processing, to "Applied". For example, the maintenance execution unit 123 notifies the job information management unit 112 of the name of the computer that has been subjected to the maintenance processing. Then, the job information management unit 112 updates the maintenance state of the corresponding computer registered in the computer management table 111a, to "Applied".

In this manner, the maintenance area having predetermined shape and size is set in the network 20 to collectively execute the maintenance processing on the computers in the maintenance area.

Next, maintenance area candidate search processing will be described in details.

Figure 10:
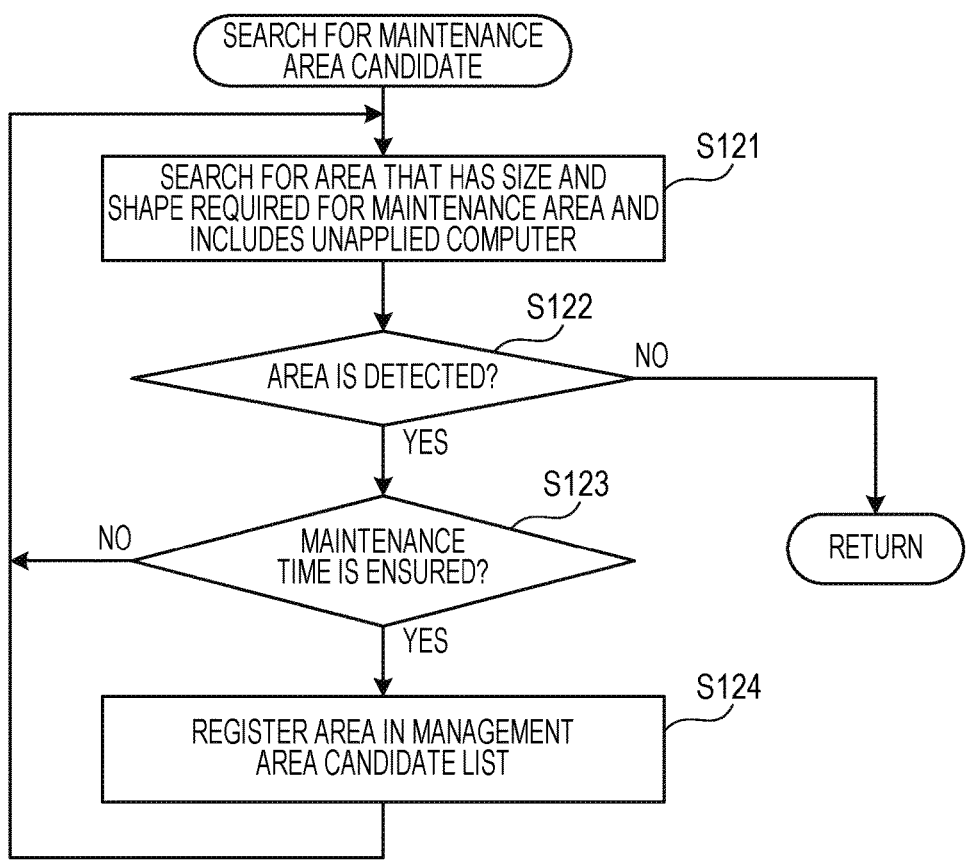
FIG. 10 is a diagram illustrating an example of an operational flowchart for maintenance area candidate search processing, according to an embodiment.

FIG. 10 is an operational flowchart illustrating an example of the maintenance area candidate search processing.

[Step S121] The maintenance execution unit 123 searches the network for an area that is not subjected to the processing in Step S122 to S124 from among areas that have a size and a shape required for the maintenance area and includes a computer that is not subjected to the maintenance processing.

[Step S122] The maintenance execution unit 123 determines whether or not the area is detected in Step S121. When the area is detected, processing proceeds to Step S123. When the area is not detected, the maintenance area candidate search processing is finished.

[Step S123] The maintenance execution unit 123 determines whether or not a maintenance time for unapplied computers in the detected area is ensured. For example, the maintenance execution unit 123 acquires an execution-scheduled job list of each of the unapplied computers in the detected area via the job information management unit 112. Next, the maintenance execution unit 123 acquires the start-scheduled time of the job in the acquired execution-scheduled job lists via the job information management unit 112. The maintenance execution unit 123 further calculates a difference between the earliest start-scheduled time and the current time. That is, the maintenance execution unit 123 calculates an unoccupied time before execution of a job in any computer. When the calculated unoccupied time is longer than a time required for the maintenance processing, the maintenance execution unit 123 determines that the maintenance time may be ensured. When the maintenance time is ensured, processing proceeds to Step S124. When the maintenance time is not ensured, processing proceeds to Step S121.

[Step S124] The maintenance execution unit 123 registers the detected area as the maintenance area candidate in the maintenance area candidate list 123a. Then, processing proceeds to Step S121.

In this manner, an area that includes the computer having the job state "Unexecuted" and the maintenance state "Unapplied" and complies with the size and shape of the maintenance area is searched for, and the found area is registered as the maintenance area candidate in the maintenance area candidate list. At this time, the maintenance execution unit 123 may include even an area that fails to have enough size due to a reason that the area is surrounded with an edge of the system, the job area, or the maintained area, as the maintenance area candidate. An area that includes a computer scheduled to execute a next job during maintenance is excluded from the maintenance area candidates.

Next, maintenance area selection processing will be described in detail.

Figure 11:
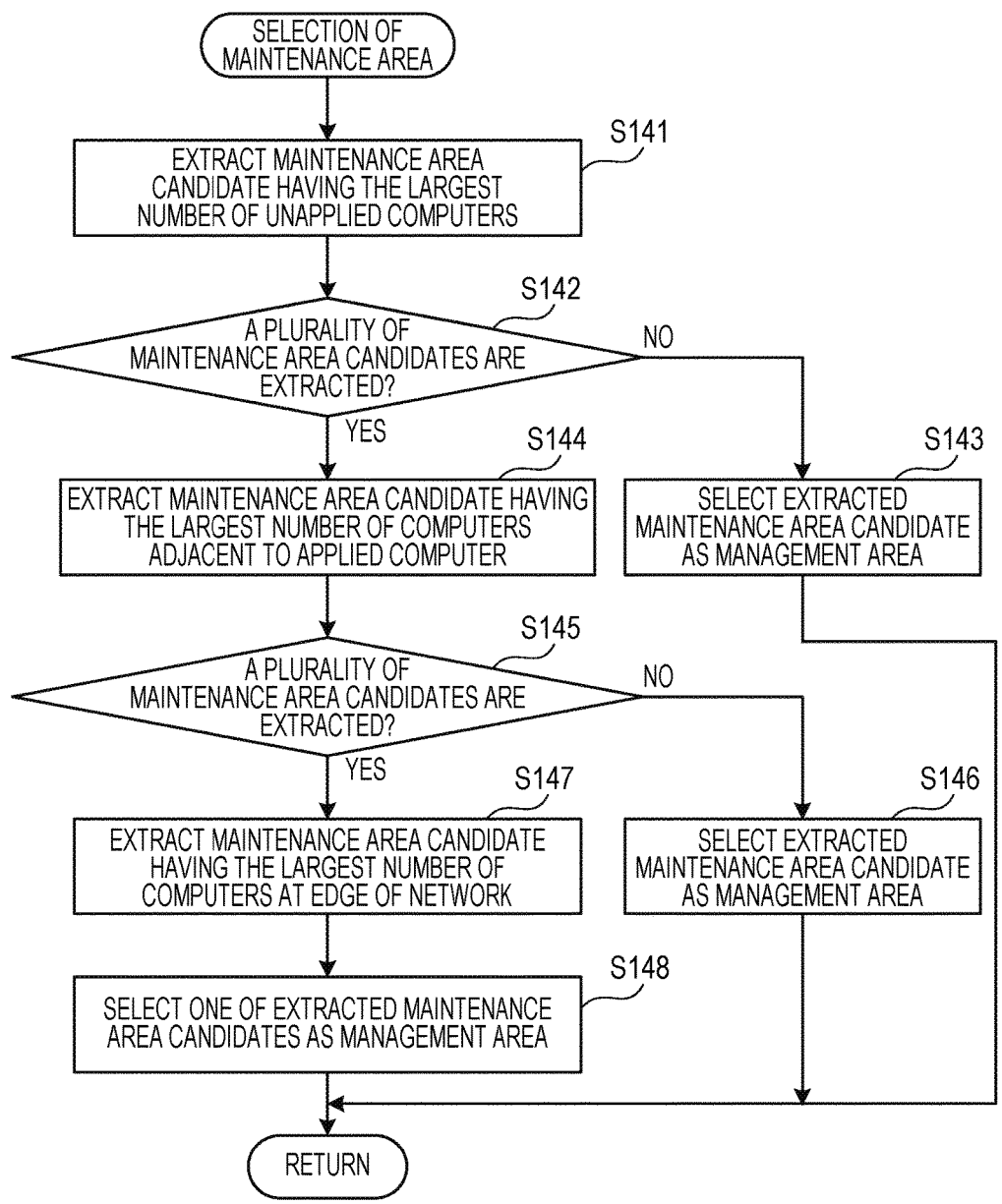
FIG. 11 is a diagram illustrating an example of an operational flowchart for maintenance area selection processing, according to an embodiment.

FIG. 11 is an operational flowchart illustrating an example of procedure of the maintenance area selection processing.

[Step S141] The maintenance execution unit 123 extracts a maintenance area candidate having the largest number of unapplied computers from among the maintenance area candidates found by search.

[Step S142] The maintenance execution unit 123 determines whether or not a plurality of maintenance area candidates are extracted in Step S141. When the plurality of maintenance area candidates are extracted, processing proceeds to Step S144. When only one maintenance area candidate is extracted, processing proceeds to Step S143.

[Step S143] The maintenance execution unit 123 selects the maintenance area candidate extracted in Step S141 as the maintenance area, and finishes the maintenance area selection processing.

[Step S144] The maintenance execution unit 123 extracts the maintenance area candidate having the largest number of computers adjacent to the applied computer, from among the plurality of maintenance area candidates extracted in Step S141.

[Step S145] The maintenance execution unit 123 determines whether or not the plurality of maintenance area candidates are extracted in Step S144. When the plurality of maintenance area candidates are extracted, processing proceeds to Step S147. When only one extracted maintenance area candidate is extracted, processing proceeds to Step S146.

[Step S146] The maintenance execution unit 123 selects the maintenance area candidate extracted in Step S144 as the maintenance area, and finishes the maintenance area selection processing.

[Step S147] The maintenance execution unit 123 extracts the maintenance area candidate including the largest number of computers located at an edge of the mesh-connected network 20, from among the plurality of maintenance area candidates extracted in Step S144.

[Step S148] The maintenance execution unit 123 selects one of the maintenance area candidates extracted in Step S147, as the maintenance area.

In this manner, one suitable maintenance area candidate is selected from among a plurality of maintenance area candidates, as the maintenance area. For example, where there are a plurality of maintenance area candidates, the maintenance area candidate to which the largest number of maintained computers are adjacent, is selected as the maintenance area. By preferentially executing maintenance processing on the computers in the area adjacent to many maintained computers, the area in which the maintained computers concentrate may be extended early. As a result, even a job having a shape larger than the maintenance area may be executed.

After the whole maintenance start time, the maintained area and the unmaintained area coexist in the network, and a job across these areas is not allowed to be executed. For this reason, based on the maintenance state of each computer in the computer management table 111a, the job schedule unit 113 searches for a first area including only applied computers or a second area including only unapplied computers, for each execution-scheduled job, according to the shape of the job. When any one of the first and second areas is found, the computers in the found area are allocated to the job. The job schedule unit 113 puts a job that is not allowed to be allocated to any one of the first and second areas, into a wait state, prioritizes the maintenance processing, and waits for a state in which an applied area expands and the job is allowed to be allocated to the expanded area.

Referring to FIG. 12 to FIG. 20, an operating example of the maintenance processing will be specifically described below.

FIG. 12 is a diagram illustrating the state of each computer before the maintenance processing. FIG. 12 illustrates an example of a parallel computer system having a mesh-connected network topology of 6×4 two-dimensional arrangement. In this figure, a horizontal axis is an x axis, and a vertical axis is a y axis. Rectangles expressed by solid lines are computers. The position of each computer is represented by x-y coordinate value. In FIG. 12, the position of the lower left computer is (0, 0), and the upper right computer is (5, 3).

The job name is illustrated in each computer that is executing a job. In the example of FIG. 12, the computers in an area 41 each execute a "job A". The computers in an area 42 each execute a "job B". Any one of computers illustrated in FIG. 12 has not been subjected to the maintenance processing yet.

It is assumed to select a maintenance area having 3×2 size in such a situation. In this case, a plurality of maintenance area candidates 51 to 56 are present. For example, the range of each of the maintenance area candidates 51 to 56 is represented by a lower left coordinate and an upper right coordinate. In the case of the maintenance area candidate 51, the range is expressed from (0, 2) to (3, 4). Given that the position of the computer is $(x_a, y_a)$, when $0 \leq x_a < 3$ and $2 \leq y_a < 4$ are satisfied, the computer is determined to fall within the maintenance area candidate 51.

The existing maintenance area candidates 51 to 56 are registered in the maintenance area candidate list 123a.

FIG. 13 is a diagram illustrating a first example of the maintenance area candidate list. The maintenance area candidate list 123a has columns for a number, an area, the number of computers adjacent to an applied computer, the number of computers at the edge of the system, and the number of unapplied computers. Identification number of the registered maintenance area candidate is set in the number column. The range of the maintenance area candidate is set in the area column. The number of computers adjacent to the computer subjected to the maintenance processing among computers in the range of the maintenance area candidate is set in the column for the number of computers adjacent to an applied computer. The number of computers located at the edge of the mesh-connected network among computers in the range of the maintenance area candidate is set in the column for the number of computers at the edge of the system. The number of computers that is not subjected to the maintenance processing among computers in the range of the maintenance area candidate is set in the column for the number of unapplied computers.

In the example of FIG. 13, the number of computers adjacent to the applied computer in all maintenance area candidates is "0". Thus, out of the two maintenance area candidates having the largest number ("6") of unapplied computers, the maintenance area candidate (number "1") having a larger number of computers at the edge of the system is selected as the maintenance area. Then, the maintenance processing for each computer in the maintenance area starts.

After that, it is assumed that "job C" having 3×2 size is entered and the "job A" is finished before completion of maintenance. In this case, the computers in a rectangular area from lower left (0, 0) to upper right (3, 2) are scheduled to execute the "job C".

Then, upon completion of the maintenance processing, the maintenance state of the computers that have executed the maintenance processing is updated to "Applied". Then, processing of selecting a next maintenance area is executed.

Figure 14:
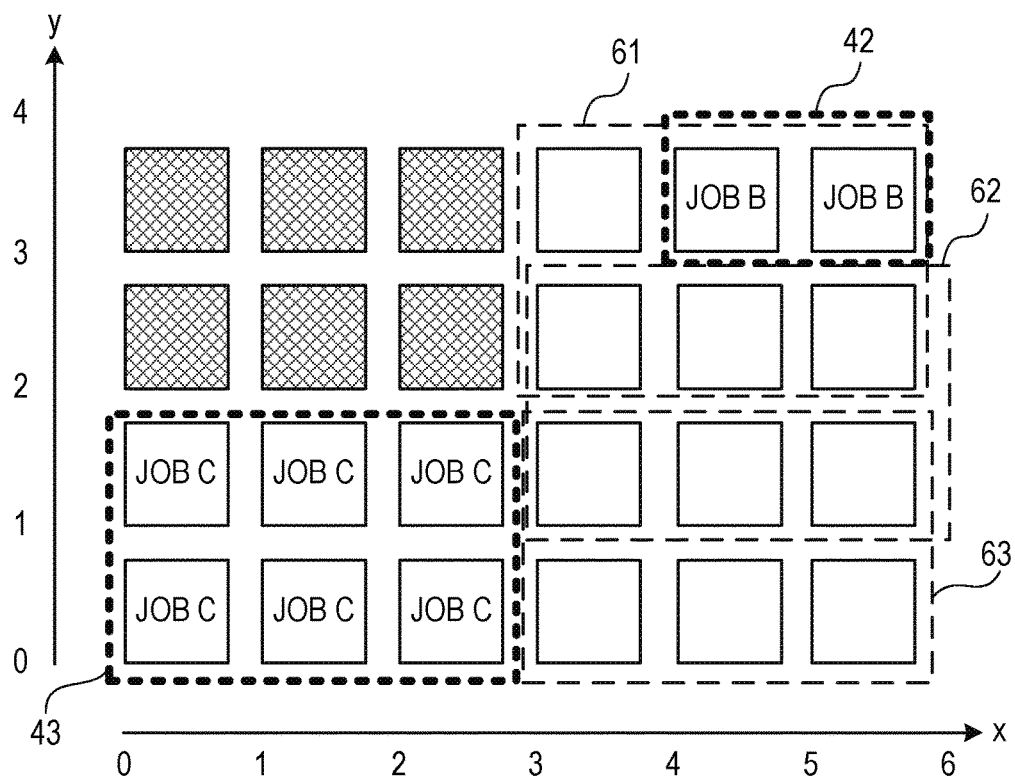
FIG. 14 is a diagram illustrating an example of a state of each computer after first maintenance processing, according to an embodiment.

FIG. 14 is a diagram illustrating the state of each computer after first maintenance processing. In the example of FIG. 14, the "job A" is finished, and computers in an area 43 are executing the "job C". The maintenance state in the maintenance area selected in the previous maintenance area selection processing is updated to "Applied".

When the search is performed for the maintenance area candidate in this state, for example, maintenance area candidates 61 to 63 are found. Then, a maintenance area candidate list that registers the maintenance area candidates 61 to 63 is generated.

FIG. 15 is a diagram illustrating a second example of the maintenance area candidate list. The maintenance area candidate list 123a registers the maintenance area candidates 61 to 63 illustrated in FIG. 14. In the example of FIG. 15, out of two maintenance area candidates having the largest number ("6") of unapplied computers, the maintenance area candidate (number "4") having a larger number of computers adjacent to the applied computer is selected as the maintenance area. Then, the maintenance processing for each computer in the maintenance area starts.

Then, upon completion of the maintenance processing, the maintenance state of the computers that have executed the maintenance processing is updated to "Applied". Then, the processing of selecting a next maintenance area is executed. It is assumed that the "job B" is finished at this time.

FIG. 16 is a diagram illustrating the state of each computer after second maintenance processing. In the example illustrated in FIG. 16, the "job B" is finished. Further, since the previous maintenance processing is completed, for example, a job having shape of 6×1 in a range from lower left (0, 2) to upper right (6, 3) may be executed.

When the search is performed for the maintenance area candidate in this state, for example, maintenance area candidates 71, 72 are found. Then, a maintenance area candidate list that registers the maintenance area candidates 71, 72 is generated.

FIG. 17 is a diagram illustrating a third example of the maintenance area candidate list. The maintenance area candidates 71, 72 in FIG. 16 are registered in the maintenance area candidate list 123a. In the example of FIG. 17, out of the two maintenance area candidates including the largest number ("3") of unapplied computers, the maintenance area candidate (number "2") having a larger number of computers adjacent to an applied computer is selected as the maintenance area. Next, the maintenance processing for each computer that is not subjected to the maintenance processing in the maintenance area starts.

Then, it is assumed that a "job D" having a shape of 4×2 is entered and the "job C" is finished before maintenance. Then, computers in a rectangular area from lower left (0, 2) to upper right (4, 4) are scheduled to execute the "job D".

Then, when the maintenance processing is completed, the maintenance state of the computers that have executed the maintenance processing is updated to "Applied". Then, the processing of selecting a next maintenance area is executed.

FIG. 18 is a diagram illustrating the state of each computer after third maintenance processing. In the example of FIG. 18, the "job C" is finished, and a "job D" is being executed by the computers in an area 44. When the search is performed for the maintenance area candidate in this state, for example, maintenance area candidates 81 to 84 are found. Next, a maintenance area candidate list that registers maintenance area candidates 81 to 84 is generated.

FIG. 19 is a diagram illustrating a fourth example of the maintenance area candidate list. The maintenance area candidate list 123a registers the maintenance area candidates 81 to 84 in FIG. 18. In the example illustrated in FIG. 19, since there is only one maintenance area candidate having the largest number ("6") of unapplied computers, the maintenance area candidate (number "1") is selected as the maintenance area. Then, the maintenance processing for each computer in the maintenance area starts.

Then, when the maintenance processing is completed, the maintenance state of the computers that have executed the maintenance processing is updated to "Applied". Then, the processing of selecting a next maintenance area is executed.

Figure 20:
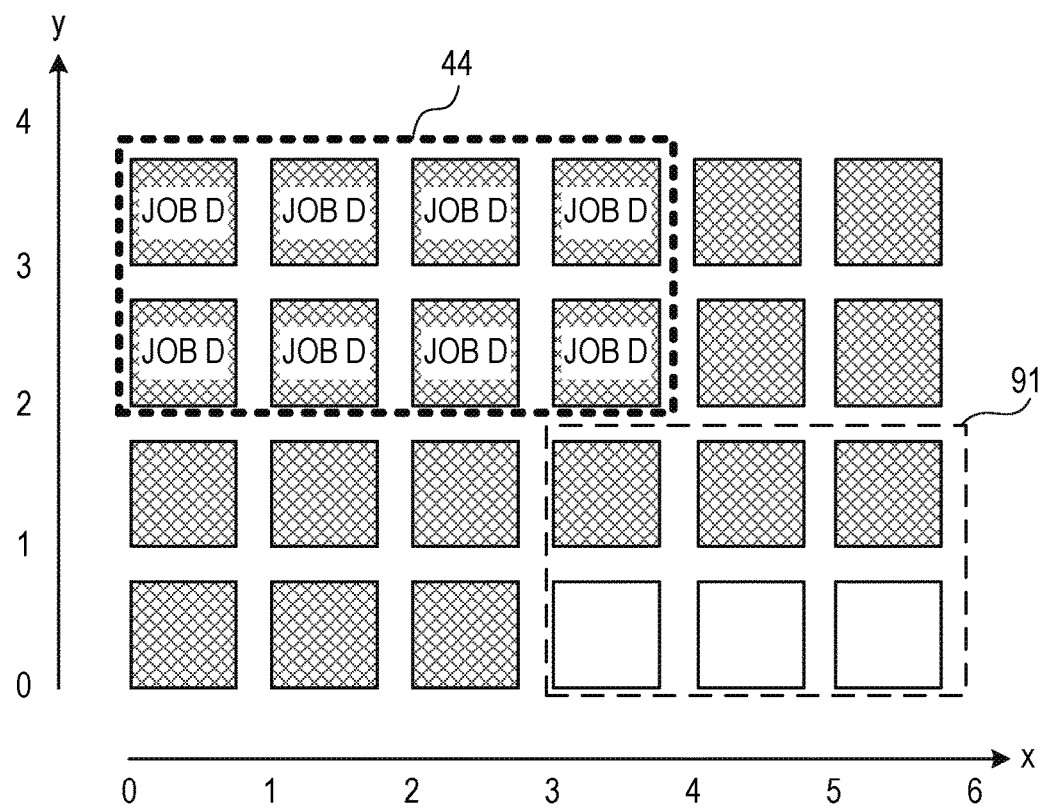
FIG. 20 is a diagram illustrating an example of a state of each computer after fourth maintenance processing, according to an embodiment.

FIG. 20 is a diagram illustrating the state of each computer after fourth maintenance processing. When the search is performed for the maintenance area candidate in the state illustrated in FIG. 20, a maintenance area candidate 91 is found. Next, the maintenance area candidate 91 is selected as the maintenance area, and the maintenance processing for each computer in the maintenance area starts. As a result, the maintenance processing for all the computers is completed.

The above mentioned maintenance processing the maintenance of the whole system to be performed in a step-by-step manner while limiting the effect of fragmentation caused by mixture of the maintained computer group and the unmaintained computer group, to the controllable extent.

Although the embodiments have been described above, each element in the embodiments may be replaced with other elements having the same function. Any other suitable structure and step may be added. Any two or more structures (features) in the embodiments may be combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer system comprising:
a plurality of computers, coupled via a multidimensional mesh or torus connection in a network, configured to execute jobs according to instructions; and
a maintenance device sending the instructions to the plurality of computers to execute the jobs and having a processor configured to:
in response to a request for executing maintenance processing on the plurality of computers in the network, detect one or more execution-scheduled jobs to be executed after an execution start time of the maintenance processing, based on start time information indicating an execution-scheduled start time of a job to be executed by two or more computers among the plurality of computers,
calculate, for each of the one or more execution-scheduled jobs, a characteristic value of an axial length of an execution-scheduled job area in each axial direction of a plurality of multidimensional axes in the network, based on area information indicating a length of the execution-scheduled job area in each axial direction of the plurality of multidimensional axes, the execution-scheduled job area including a group of the computers to execute the one or more execution-scheduled jobs,
sequentially determine maintenance areas in the network on which the maintenance processing is to be executed, based on the characteristic value of the axial length of the execution-scheduled job area for the one or more execution-scheduled jobs, so that each of the maintenance areas includes one or more unapplied computers that have not been subjected to the maintenance processing, while executing the maintenance processing on the area computers in each of the maintenance areas, until the maintenance processing is executed on all the plurality of computers in the network,
calculate an obtained value by adding a standard deviation of computer counts to an average value of the computer counts, the computer counts indicating a number of the computers included in the execution-scheduled job area for the one or more execution-scheduled jobs, and
designate the maintenance area to include the obtained number of the computers.

2. The parallel computer system of claim 1, wherein the processor of the maintenance device is further configured to:
determine an axial length of the maintenance area in each axial direction of the plurality of multidimensional axes, based on the characteristic value of the axial lengths of the execution-scheduled job area in the each axial direction of the plurality of multidimensional axes,
search the network for an area, whose axial lengths are respectively equal to the determined axial lengths of the maintenance area, and which includes one or more unapplied computers that have not been subjected to the maintenance processing, and
determine the area that has been found by searching the network as the maintenance area.

3. The parallel computer system of claim 2, wherein when a plurality of areas are found as the maintenance area, the processor of the maintenance device determines an area including a greater number of computers that are adjacent to at least one applied computer that has been subjected to the maintenance processing, as the maintenance area.

4. The parallel computer system of claim 1, wherein the processor of the maintenance device determines an area that includes neither a computer that is executing a job at a time of determining the maintenance area nor a computer that is scheduled to start execution of a job after determining the maintenance area and before an elapse of time required for the maintenance processing, as the maintenance area.

5. The parallel computer system of claim 1, wherein the maintenance processing includes software updating.

6. An apparatus for executing maintenance processing on computers coupled via a multidimensional mesh or torus connection in a network, the apparatus comprising:
a memory configured to store start-time information indicating execution-scheduled start time of a job to be executed by two or more of the computers and area information indicating a length of a job area in each axial direction of a plurality of multidimensional axes in the network, the job area including a group of the computers to execute the job; and
a processor coupled to the memory, configured to:
in response to a request for executing maintenance processing on the computers in the network, detect one or more execution-scheduled jobs to be executed after an execution start time of the maintenance processing, based on the start-time information,
calculate, for each of the one or more execution-scheduled jobs, a characteristic value of an axial length of an execution-scheduled job area in each axial direction of the plurality of multidimensional axes in the network, based on the area information, the execution-scheduled job area including a group of the computers to execute the one or more execution-scheduled jobs,
sequentially determine maintenance areas in the network on which the maintenance processing is to be executed, based on the characteristic value of the axial length of the execution-scheduled job area for the one or more execution-scheduled jobs, so that each of the maintenance areas includes one or more unapplied computers that have not been subjected to the maintenance processing, while executing the maintenance processing on the area computers in each of the maintenance areas, until the maintenance processing is executed on all the computers in the network, calculate an obtained number by adding a standard deviation of computer counts to an average value of the computer counts, the computer counts indicating a number of the computers included in the execution-scheduled job area for the one or more execution-scheduled jobs, and designate the maintenance area to include the obtained number of the computers.

7. A method for executing maintenance processing on computers coupled via a multidimensional mesh or torus connection in a network, the method comprising:

in response to a request for executing maintenance processing on computers in the network, detecting one or more execution-scheduled jobs to be executed after an execution start time of the maintenance processing, based on start time information indicating an execution-scheduled start time of a job to be executed by two or more computers among the computers;

calculating, for each of the one or more execution-scheduled jobs, a characteristic value of an axial length of an execution-scheduled job area in each axial direction of a plurality of multidimensional axes in the network, based on area information indicating a length of the execution-scheduled job area in each axial direction of the plurality of multidimensional axes, the execution-scheduled job area including a group of the computers to execute the one or more execution-scheduled jobs;

calculating an obtained number by adding a standard deviation of computer counts to an average value of the computer counts, the computer counts indicating a number of the computers included in the execution-scheduled job area for the one or more execution-scheduled jobs; and sequentially determining maintenance areas in the network on which the maintenance processing is to be executed, based on the characteristic value of the axial length of the execution-scheduled job area for the one or more execution-scheduled jobs, so that each of the maintenance areas includes one or more unapplied computers that have not been subjected to the maintenance processing, while executing the maintenance processing on the area computers in each of the maintenance areas, until the maintenance processing is executed on all the computers in the network, wherein each of the maintenance areas includes the obtained number of the computers.

8. A non-transitory, computer-readable recording medium having stored therein a program for causing a computer included in a maintenance device to execute maintenance processing on computers coupled via a multidimensional mesh or torus connection in a network, the maintenance processing comprising:

in response to a request for executing maintenance processing, detecting one or more execution-scheduled jobs to be executed after an execution start time of the maintenance processing, based on start time information indicating an execution-scheduled start time of a job to be executed by two or more computers among the computers;

calculating, for each of the one or more execution-scheduled jobs, a characteristic value of an axial length of an execution-scheduled job area in each axial direction of a plurality of multidimensional axes in the network, the execution-scheduled job area including a group of the computers to execute the one or more execution-scheduled jobs;

calculating an obtained number by adding a standard deviation of computer counts to an average value of the computer counts, the computer counts indicating a number of the computers included in the execution-scheduled job area for the one or more execution-scheduled jobs; and sequentially determining maintenance areas in the network on which the maintenance processing is to be executed, based on the characteristic value of the axial length of the execution-scheduled job area for the one or more execution-scheduled jobs, so that each of the maintenance areas includes one or more unapplied computers that have not been subjected to the maintenance processing, while executing the maintenance processing on the area computers in each of the maintenance areas, until the maintenance processing is executed on all the computers in the network, wherein each of the maintenance areas includes the obtained number of the computers.

* * * * *